US006870399B2

United States Patent
Ngo et al.

(10) Patent No.: US 6,870,399 B2
(45) Date of Patent: Mar. 22, 2005

(54) BIDIRECTIONAL INPUT/OUTPUT CELLS

(75) Inventors: Hiep P. Ngo, Boston, MA (US);
William B. Gist, Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 573 days.

(21) Appl. No.: 09/999,852

(22) Filed: Oct. 31, 2001

(65) Prior Publication Data

US 2004/0119519 A1 Jun. 24, 2004

(51) Int. Cl.$^7$ .......................................... H03K 19/0175
(52) U.S. Cl. ............................. 326/82; 326/83; 326/86; 326/90
(58) Field of Search ................... 326/30, 81, 82, 326/83, 86, 90; 327/108–112

(56) References Cited

U.S. PATENT DOCUMENTS

| 5,097,144 A | * | 3/1992 | Chang et al. ............... 327/109 |
| 5,325,355 A | * | 6/1994 | Oprescu et al. ............. 370/282 |
| 6,127,849 A | * | 10/2000 | Walker ........................ 326/86 |
| 6,304,106 B1 | * | 10/2000 | Cecchi et al. ................ 326/86 |
| 6,452,428 B1 | * | 9/2002 | Mooney et al. ............. 327/108 |
| 6,690,196 B1 | * | 2/2004 | Cecchi et al. ................. 326/82 |

OTHER PUBLICATIONS

"A 900 Mb/s Bi–directional Signaling Scheme", by Mooney et al., IEEE Journal of Solid–State Circuits, vol. 30, No. 12, Dec. 1995.

"3.2 GHz 6.4 Gb/s per Wire Signaling in 0.18 micro meter CMOS", by M. Haycock and R. Mooney, published in the Digest of Technical Papers presented in the IEEE International Solid–State Circuits Conference Feb. 5–6, 2001 pp. 62–63 and 430.

* cited by examiner

Primary Examiner—Vibol Tan
(74) Attorney, Agent, or Firm—Gunnison, McKay & Hodgson, L.L.P.

(57) ABSTRACT

A bi-directional input/output (IO) cell for transmitting and receiving data signals simultaneously over a single line. The bidirectional IO cell having an IO node adapted to connect to the line. A driver has an output connected to the line and an input for receiving a core output signal. A first differential amplifier has a first input connected to the IO node and a second input connected to a high voltage reference circuit. A second differential amplifier has a first input connected to the IO node and a second input connected to a low voltage reference circuit.

25 Claims, 7 Drawing Sheets

| COA | COB | REF A | REF B | LINE |
|-----|-----|-------|-------|------|
| 0 | 0 | 1/4 Vcc | 1/4 Vcc | Vss |
| 0 | 1 | 1/4 Vcc | 3/4 Vcc | 1/2 Vcc |
| 1 | 0 | 3/4 Vcc | 1/4 Vcc | 1/2 Vcc |
| 1 | 1 | 3/4 Vcc | 3/4 Vcc | Vcc |

BIDIRECTIONAL INPUT/OUTPUT CELLS

FIELD OF THE INVENTION

The present invention relates to input/output cells for computer systems. More specifically, the present invention relates to bi-directional input/output (IO) cells having a pair of differential amplifiers for receiving input data.

BACKGROUND OF THE INVENTION

IO cells are semiconductor circuit devices generally embedded in a semiconductor material core, which are designed to send and/or receive binary data signals through a transmission line. By way of examples, IO cells may be used in a system bus for a computer system, or in the various internal busses and system bus interface units within a CPU, or may be stand alone devices on an integrated circuit chip. Additionally, the IO cells can be used to send and receive data between peripherals of a computer system, or through transmission lines connected to routers, servers and other such devices in an electronic communications network.

IO bandwidth is the amount of data that can be transmitted between IO cells in a fixed amount of time. Rapid improvements in integrated circuit technology have imposed ever-increasing requirements for larger IO bandwidth. This is particularly problematic for I/O devices, which must interface with a CPU core. For example, a fast disk drive can be hampered by a bus with low IO bandwidth.

Bi-directional I/O cells are designed to increase 10 bandwidth by reducing the number of wires needed to transmit data by enabling simultaneous transmission of data on the same wire. One such prior art bi-directional I/O cell is described in the article titled "A 900 Mb/s Bi-directional Signaling Scheme", by Mooney et al., in the IEEE Journal of solid-state Circuits, Vol. 30, No. 12, December 1995 (the Mooney article), which is herein incorporated by reference.

The Mooney article describes the basic theory of bi-directional IO cells in an idealized situation utilizing a single differential amplifier as the receiver of the IO cells. For purposes of clarity, a prior art bi-directional IO cell in accordance with the Mooney article will now be described.

Referring to FIG. 1, an exemplary embodiment of a pair of prior art bi-directional IO cells in accordance with the Mooney article is shown generally at IO. The pair IO includes IO cell 12 (cell A) connected to IO cell 14 (cell B) through a line 16 having a predetermined line impedance of Zo 17. Each IO cell 12 and 14 has an output driver 18 (DRV A) and 20 (DRV B) configured to output data through their respective driver output terminals 22 and 24. The pair of output terminals 22 and 24 is placed on opposite ends of the line 16 at IO ports (or nodes) 26 and 28, and data is transmitted simultaneously in two directions. This theoretically doubles the effective bandwidth per wire without requiring an increase in the bandwidth requirements of the system components.

This scheme takes advantage of the fact that, in an ideally impedance matched system, no reflections or noise occur, and so the bandwidth in the opposite direction of signal flow is available for use. The output impedance of the drivers 18 and 20 are ideally adjusted to match the impedance 17 (Zo) of the line 16 and used as the termination for the driver on the opposite end of the line 16.

Core output signal 30 (COA) from the components (not shown) is electrically connected in series with node 32 and input 34 of driver 18. Core output signal 36 (COB), also from the components, is in series connection with node 38 and tho input 40 of driver 20. Node 32 is also in electrical communication to the select input 42 of reference voltage source 44 (REF A), and node 38 is additionally in electrical communication to the select input 46 of reference voltage source 48 (REF B). Both the REF A and REF B voltage sources have a high voltage level reference output and a low voltage level reference output which are predetermined percentages of the CPU board level power supply voltage Vcc, e.g., in this embodiment ¾ Vcc for the high reference and ¼ Vcc for the low reference. The select inputs 42 and 46 select between the high and low reference voltages of REFA and REFB depending on whether COA and COB are in a high state or low state resectively. The reference voltages are transmitted through thee reference source outputs 50 and 56 respectively. In this way, the reference voltage sources REF A and REF B are dynamically adjustable depending on the state of the core output data COA and COB respectively.

In turn, the output 50 of REF A 44 is connected to the inverting input 52 of a single differential amplifier 54 (DIFF A), and the output 56 of REF B 48 is connected to the inverting input 58 of a single differential amplifier 60 (DIFF B). DIFF A and B are utilized as the receivers for the IO cells 12 and 14 respectively. That is, the non-inverting input 62 of DIFF A receives data transmitted to the IO port 26 from IO cell 14, and the non-inverting input 64 of DIFF B receives data transmitted to IO port 28 from IO cell 12. The output 66 of DIFF A generates the core input data 70 (CIA) for Cell A, and the output 68 of DIFF B generates the core input data 72 (CIB) for Cell B.

Referring to FIGS. 2 and 3, if the transmission line losses are small, e.g., the length of the transmission line 16 is only a few meters, than the COA and COB outputs form a voltage divider circuit as shown generally at 80 in FIG. 2. This voltage divider circuit 80 is used to transmit four binary states on the line 16. These correspond to combinations of the two states of the two drivers 18 and 20. The voltage divider 80 creates an encoding of the four binary states, which are shown in FIG. 3.

This encoded data is decoded by adjusting the threshold of the differential amplifiers, DIFF A and DIFF B, according to the state of the outgoing data. This is the purpose of the reference generators (REFA and REFB). To highlight this process the following four examples cover four data sequences of:

1) COA switching between low and high when COB is in a low state;
2) COA switching between low and high when COB is in a high state;
3) COB switching between low and high when COA is in a low state; and
4) COB switching between low and high when COA is in a high state.

In the first example, consider the data sequence shown in FIG. 4. For purposes of clarity, the data signals are given the same reference numbers and names as the associated hardware, which generates them in FIG. 1. In this example, COB of FIG. 1 is in the low state and COA is switching, i.e., transmitting data. As COA switches between the high and low states, the line voltage moves between ½ Vcc and Vcc, respectively. REFA alternates between ¾ Vcc and ¼ Vcc, while REFB is a constant ¼ Vcc. Note that the line voltage is always lower than REFA, while DIFFB sees a signal with a ½ Vcc swing centered on a ¼ Vcc reference. CIA is, therefore, a constant zero, which reflects the state of COB, while CIB follows COA. REFA switching is used to keep CIA constant as the line voltage switches.

Referring again to FIG. 3, the second example is when COB remains high, i.e., 1, and COA switches from 0 to 1. In this example the line 16 switches from ½ Vcc and Vcc while REF A always remains below the line 16 as it switches from ¼ Vcc to ¾ Vcc. Therefore, the output of DIFFA, i.e., CIA, will remain a constant at 1 following the output of COB. On the other hand, REF B is constant at ¾ Vcc so the output of DIFFF B, i.e., CIB, will swing from 0 to 1 to follow COA.

The third example is when COA remains low, and COB switches from 0 to 1. In that case the line 16 switches from Vss (the system common) to ½ Vcc. REF A remains constant at ¼ Vcc and REF B switches between ¼ Vcc and ¾ Vcc. Since REF B is always above the line 16 signal, CIB will follow COA and remain 0. Since the line will swing above and below REF A, the output of CIA will follow the output of COB and switch from 0 to 1.

In the fourth example, COA remains high, COB switches from 0 to 1, and the line 16 switches from ½ Vcc to Vcc. REF A remains constant at ¾ Vcc and REF B switches between ¼ Vcc and ¾ Vcc. Since REF B is always below the line 16 signal, CIB will follow COA and remain at 1. Since the line will swing above and below REF A, the output of CIA will follow the output of COB and switch from 0 to 1.

In each of the above four examples, it can be seen that CIB is configured to follow the output of COB, and CIA is configured to follow the output of COB. Both drivers 22 and 24 switching is a direct extension of the above four examples with both REFA and RBFB switching to correctly decode the line voltage 16 at the differential amplifiers DIFF A and DIFF B, i.e., the receivers. Dynamically adjusting the receiver threshold reference voltage REF A and REF B allows, in effect, a digital decoding of the line voltage 16. This reduces the susceptibility of the circuit to noise in comparison with analog decoding methods.

In this ideal case (i.e., a loss less line 16, both drivers 18 and 20 ideally matched to the line 16, no noise problems and step function input signals at nodes 26 and 28), the presence of the transmission line 16 does not affect the decoding, since the line 16 is correctly terminated for signals traveling in both directions. The only effect of the line 16 is a time shifting of the edges from and to nodes 26 and 28. In this ideal system, the only voltages seen on the line 16 and at nodes 26 and 28 will be those shown in FIG. 3.

However, switching between voltage references introduce switching errors on the inverting input of each differential amplifier DIFF A and B. These switching errors can get magnified by several orders of magnitude as they pass through the amplifier, making the output signals CIA and CIB unacceptably noisy. This becomes especially problematic when communicating between a pair of devices having many IO cells tied in parallel to reference voltage circuits at the CPU board level. Under those conditions, the switching errors can be transmitted among the IO cells greatly exacerbating the problem.

Additionally, the receiver and reference voltage circuits described in the Mooney article can have noise problems due to several factors. For example, electromagnetic emissions from a variety of internal or external sources, e.g., radio waves, near by electrical wires or bad connections, can produce substantial random noise, i.e., EMI, on the output of the receivers. Also the switching power supplies, which are connected to the reference circuits, can introduce switching noise, i.e., di/dt noise. Common mode noise, i.e., noise signals that are common to both inputs of a power supply or amplifier, can also be a significant factor.

Moreover, noise can be generated from impedance mismatches that may arise at the IO cell termination point (the output drives of the IO cell) as reflected signals arrive during an outbound transition. That is, mismatches in the impedance at the ends of the transmission line can cause output data signals to be reflected back at a natural frequency that is dependent in large part on the length of the transmission line. This natural frequency is not always in phase with the frequency of the output data signals. The switching of output data signals during the transitioning of incoming reflected data signals can create an a lot of noise therefore significantly decreasing the signal to noise ratio in the input and output signals.

Leakage current on the output side of the receivers, i.e., differential amplifiers, can also be a problem. The thickness of both the p and n layers at the p-n junctions of the latest generation differential amplifiers are designed very thin, e.g., only about 10 atoms thick, for high speed switching. However, these thin layers are also prone to leakage currents, which can skew the data signals.

An attempt to minimize some of these problems is disclosed in another prior art bidirectional IO cell design described in the article titled "3.2 GHz 6.4 Gb/s per Wire Signaling in 0.18 micro meter CMOS, by M. Haycock and R Mooney, published in the Digest of Technical Papers presented in the IEEE International Solid-State Circuits Conference, Feb. 5–6 2001, pages 62–63 and 430, ISSN: 0193-6530 (the Haycock article), which is herein incorporated by reference. This article describes a bidirectional IO cell having a variable output slew rate, which can limit the frequency content on the link between IO cells, reduce the di/dt noise during switching, and mitigate the effects of impedance discontinuities.

However, the variable output slew rate is a relatively complex circuit that increases chip space and increases cost. Additionally, inherent problems due to random EMI noise, di/dt noise, common mode noise, leakage currents and impedance mismatches still exist for the circuit described in the Haycock article. Moreover, the errors introduced by switching between reference voltage levels on the input of the differential amplifier receivers is not addressed in the Haycock article.

Based on the foregoing, it is the general object of the present invention to provide a signal conditioning circuit for a bi-directional IO cell that overcomes the problems and drawbacks associated with prior bi-directional IO cells.

SUMMARY OF THE INVENTION

The present invention offers advantages and alternatives over the prior art by providing in a first aspect a bi-directional input/output (IO) cell for transmitting and receiving data signals simultaneously over a single line. The bi-directional IO cell having an IO node adapted to connect to the line. A driver has an output connected to the line and an input for receiving a core output signal. A first differential amplifier has a first input connected to the IO node and a second input connected to a high voltage reference circuit. A second differential amplifier has a first input connected to the IO node and a second input connected to a low voltage reference circuit.

In an alternative embodiment of the invention, the IO cell includes a first selector switch having an input connected to an output of the first differential amplifier, and a second selector switch having an input connected to an output of the second differential amplifier. The first and second selector switches each has an output connected to a common receiver output node.

In another alternative embodiment the IO cell includes a switch selector circuit. The selector switch circuit has an input for receiving the core output signal. A first switch select output is connected to the first selector switch, and a second switch select output is connected to the second selector switch. The switch selector circuit activates the first selector switch through the first switch select output when the core output signal is in a high state. The switch select circuit also activates the second selector switch through the second switch select output when the core output signal is in a low state.

In another embodiment, the IO cell includes a first capacitor in series connection between a power supply voltage (Vdd) of the IO cell and the receiver output node, and a second capacitor in series connection between a voltage common (Vss) of the IO cell and the receiver output node. The first and second capacitors integrate the output of the first and second differential amplifiers to produce a core input signal.

DETAILED DESCRIPTION OF THE PREFERRED EMBODIMENTS

Figure 5:
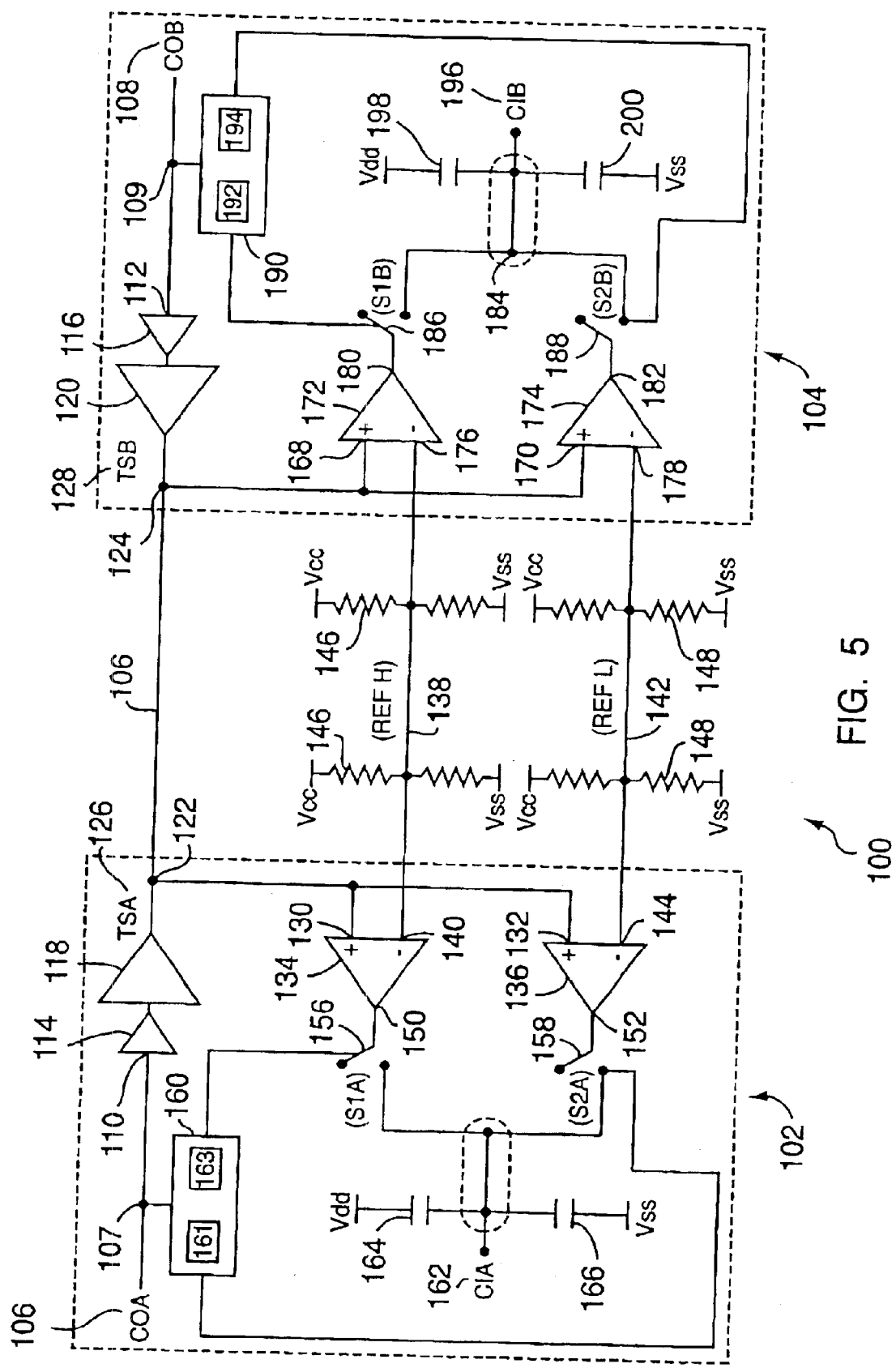
FIG. 5 is a schematic of an exemplary embodiment of a pair of bi-directional IO cells in accordance with the present invention.

Referring to FIG. 5, an exemplary embodiment of a bidirectional IO cell circuit in accordance with the present invention is shown generally at 100. One skilled in the art will recognize that the basic principles of bi-directional communication, which apply to the prior art IO cell circuit 10, also apply to the IO cell circuit 100 as well. As those principles were described in detail hereinbefore, no further discussion is required.

The pair of impedance matched IO cells 102 and 104 are connected together and communicate through line 106. Core output signal 106 (COA) from the components (not shown) is electrically connected in series with node 107 and input 110 of pre-amplifier 114. Core output signal 108 (COB) from the components (not shown) is electrically connected in series with node 109 and input 112 of pre-amplifier 116. The pre-amplifiers 114 and 116 are in series connection with the inputs of drivers 118 and 120 respectively, and the outputs of drivers 118 and 120 are connected to IO nodes 122 and 124 respectively.

The total input signal 126 (TSA) at the 10 node 122 is the sum of the amplified core output COA, plus incoming amplified signal COB (attenuated by the impedance of line 106), plus the total noise induced at node 122. The total input signal 128 (TSB) at the 10 node 124 is the sum of the amplified core output COB, plus incoming amplified signal COA (attenuated by the impedance of line 106), plus the total noise induced at node 124. The noise signals, at each of the nodes 122 and 124, includes power supply switching noise, EMI noise and signal reflections due to impedance mismatches at the line terminations.

Focusing on IO cell 102, the node 122 is connected to the non-inverting inputs 130 and 132 of the differential amplifiers (receivers) 134 and 136 respectively. Voltage reference circuit 138 (REFH) is connected to the inverting input 140 of receiver 134, and supplies the high threshold voltage level required to decode incoming data from node 124 of IO cell 104 when the core output data COA is in its high state. Voltage reference circuit 142 (REFL) is connected to the inverting input 144 of receiver 136, and provides the low threshold voltage level required to decode incoming data from node 124 of IO cell 104 when COA is in its low state. The voltage reference circuits 138 and 142 include voltage divider circuits 146 and 148 connected between Vcc, and Vss. The voltage dividers 146 and 148 provide a high and low voltage level that is a predetermined percentage of Vcc, e.g., ¾ Vcc for a high reference and ¼ Vcc for a low reference.

The outputs 150 and 152 of the pair of parallel differential amplifiers 134 and 136 are selectably tied together at node 154 through switches 156 (S1A) and 158 (S2A) respectively. Node 107 and the COA are also in electrical communication with switch select circuit 160, which is in turn in electrical communication with switches S1A and S2A. Switch select circuit includes a delay-on circuit 161 and a delay-off circuit 163. As will be described in greater detail hereinafter, the delay-on circuit 161 and the delay-off circuit 163 are utilized to time the switching of S1A and S2A to sample the outputs of differential amplifiers 134 and 136 between, but not during, transitions of the core output signal COA. The switch select circuit 160 alternately selects between S1A and S2A depending on whether COA is in a high state or a low state respectively.

Figure 1:
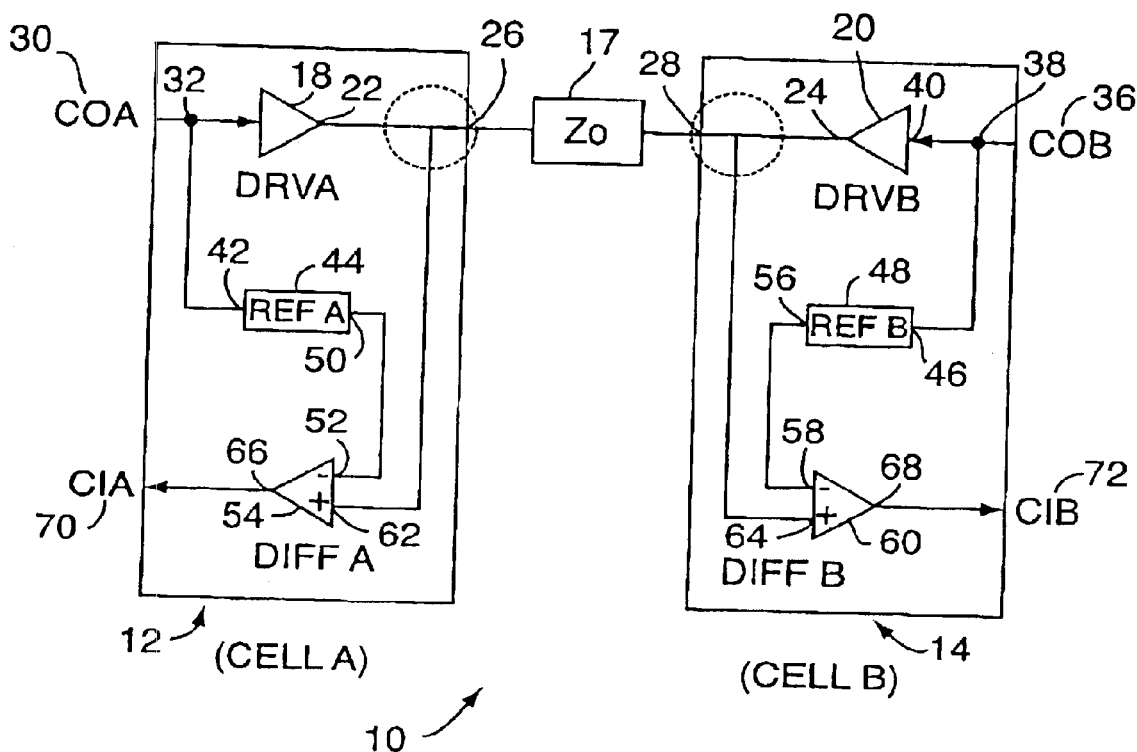
FIG. 1 is a schematic of an exemplary embodiment of a pair of prior art bi-directional IO cells.
Figure 2:
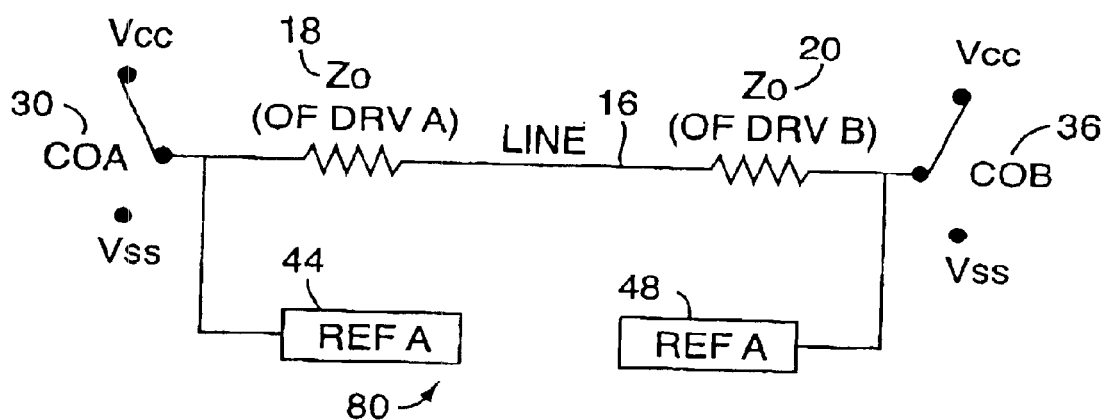
FIG. 2 is a schematic of a voltage divider circuit formed by the prior art IO cells of FIG. 1.
Figures 3, 4:
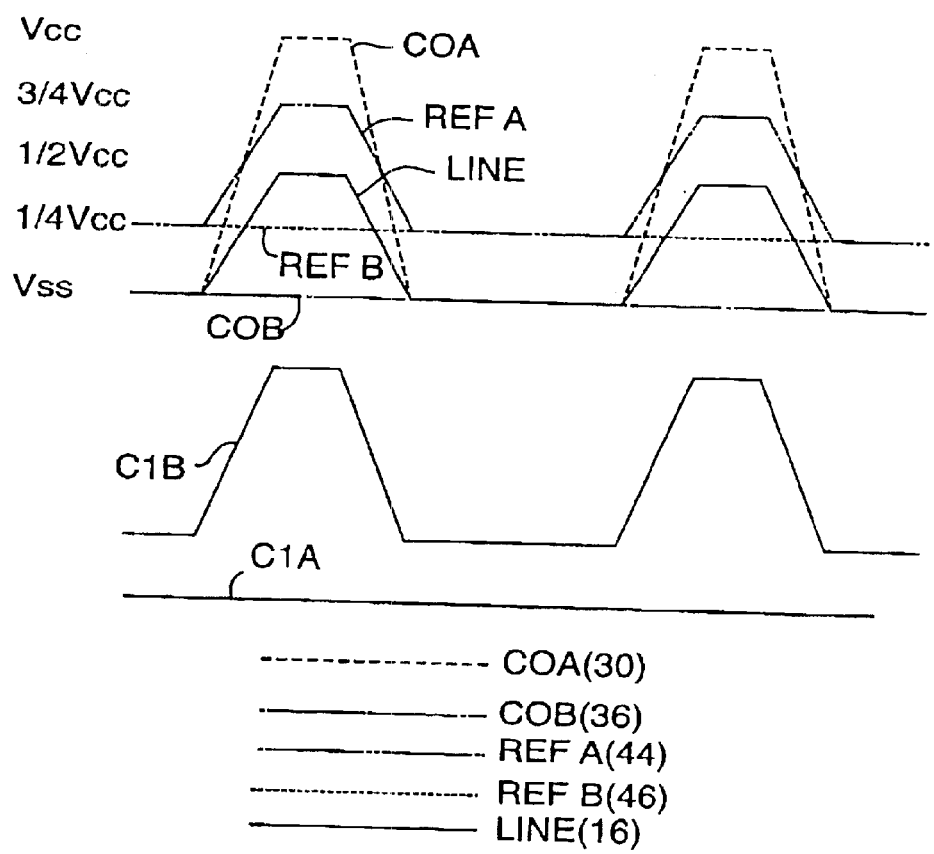
FIG. 3 is a table illustrating the binary states of the voltage divider circuit of FIG. 2.
FIG. 4 is a timing diagram illustrating the dynamic adjustment of high an low reference voltages as the core outputs of the prior art IO cells of FIG. 1 change state.

In this way, the reference voltages REFH and REFL are dynamically adjustable depending on the state of the core output COA in much the same way as the bi-directional cells described in the Mooney article. However, in contrast to the prior art Mooney article IO cells 12 and 14 (see FIG. 1), switching between voltage references is accomplished on the output side of the differential amplifiers 134 and 136, rather than on the input side. Therefore the problem of amplification of reference voltage switching errors is eliminated.

The outputs from the pair of differential amplifiers 130 and 132 generate through node 154 the core input signal 162 (CIA). Node 154 is in turn series connection with the high voltage level Vdd, i.e., the IO cell power supply voltage, through Vdd capacitor 164, and with the low voltage level Vss through Vss capacitor 166. The opposing capacitors integrate the signal CIA to average out any random noise such as switching power supply noise or EMI noise. Additionally, as will be explained in greater detail hereinafter, the ratio of the capacitance values and leakage current values of the opposing capacitors 164 and 166 are approximately the same as the capacitance ratios and leakage currents of the n and p layers of the differential amplifiers 134 and 136. In this way the opposing capacitors 164 and 166 also compensate for common mode voltage variances and leakage currents across the differential amplifier receivers 134 and 136.

Focusing on IO cell 104, the function of this IO cell 104 is essentially the same as that of IO cell 102. The node 124 is connected to the non-inverting inputs 168 and 170 of the differential amplifiers (receivers) 172 and 174 respectively. Voltage reference circuit 138 (REFH) is connected to the inverting input 176 of receiver 172, and supplies the high threshold voltage level required to decode incoming data from node 122 of IO cell 102 when the core output data COB is in its high state. Voltage reference circuit 142 (REFL) is connected to the inverting input 178 of receiver 174, and provides the low threshold voltage level required to decode incoming data from node 122 of IO cell 102 when COB is in its low state.

The outputs 180 and 182 of the pair of parallel receivers 172 and 174 are selectably tied together at node 184 through switches 186 (S1B) and 188 (S2B) respectively. Node 109 and the signal COB are also in electrical communication with switch select circuit 190, which is in turn in electrical communication with switches S1B and S2B. Switch select circuit 190 includes a delay-on circuit 192 and a delay-off circuit 194. The delay-on circuit 192 and the delay-off circuit 194 are utilized to time the switching of S1B and S2B to sample the outputs of receivers 172 and 174 between, but not during, transitions of the core output signal COB. The switch select circuit 190 alternately selects between S1B and S2B depending on whether COB is in a high state or a low state respectively.

The outputs from the pair of parallel receivers 172 and 174 generate through node 184 the core input signal 196 (CIB). Node 184 is in turn in series connection with the high voltage level Vdd through Vdd capacitor 198, and with the low voltage level Vss through Vss capacitor 200.

The remaining detailed description focuses solely on IO cell 102. However one skilled in the art would recognize that the same principles apply to IO cell 104 as well.

Figure 6:
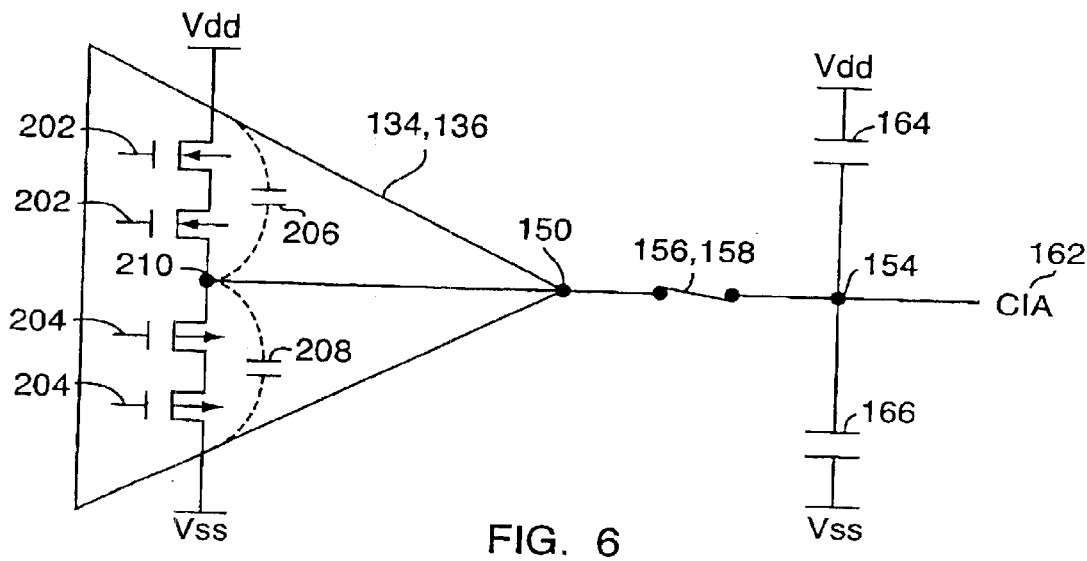
FIG. 6 is a schematic of a differential amplifier receiver connected to integrating capacitors of an IO cell of FIG. 5.

Referring to FIG. 6, the differential amplifiers 134 and 136 are composed of a plurality of internal PMOS transistors 202 electrically connected between Vdd and the output terminal 150. The amplifiers 134 and 136 also include a plurality of NMOS transistors 204 electrically connected between Vss and the output terminal 150. The NMOS and PMOS transistors 202 and 204 are formed from layers of N type material and P type material which act as capacitor plates with an associated capacitance between Vdd, the output terminal 150 and Vss (as represented by the capacitor symbols 206 and 208 respectively). The output terminal 150 of the differential amplifiers 134 and 136 is connected internally to the p-n junction 210 between the N and P type transistors to form a type of internal capacitor bridge. In much the same way the output terminal 150 is connected externally to node 154 to form an external capacitor type bridge between capacitors 164 and 166. Common mode noise will cause the core-input signal CIA 162 to float or change relative to Vdd and Vss at each junction 210 and 154 in proportion to the ratio of capacitance values of each bridge. Therefore, in order to filter out common mode noise effects the capacitor bridges must be balanced. That is the ratio of the capacitance values between capacitors 164 and 166 is sized to be approximately equal to the ratio of the internal capacitance values associated with the transistors 202, 204 of the differential amplifiers 134, 136 from Vdd to the output terminal 150 and from Vss to the output terminal 150 respectively.

In order to meet the high speed switching requirements of the latest generation CPUs, the thickness of both the P and N layers forming the NMOS and PMOS transistors of the differential amplifiers 134, 136 are designed very thin, e.g., only about 10 atoms thick. However, these thin layers are also prone to leakage currents, which can skew the core-input signal CIA 162. In order to mitigate the effects of these leakage currents, it is also important that the ratio of the leakage currents between capacitors 164 and 166 be approximately equal to the ratio of the leakage currents associated with the transistors 202, 204 of the differential amplifiers 134, 136 from Vdd to the output terminal 150 and from Vss to the output terminal 150 respectively.

Figure 7:
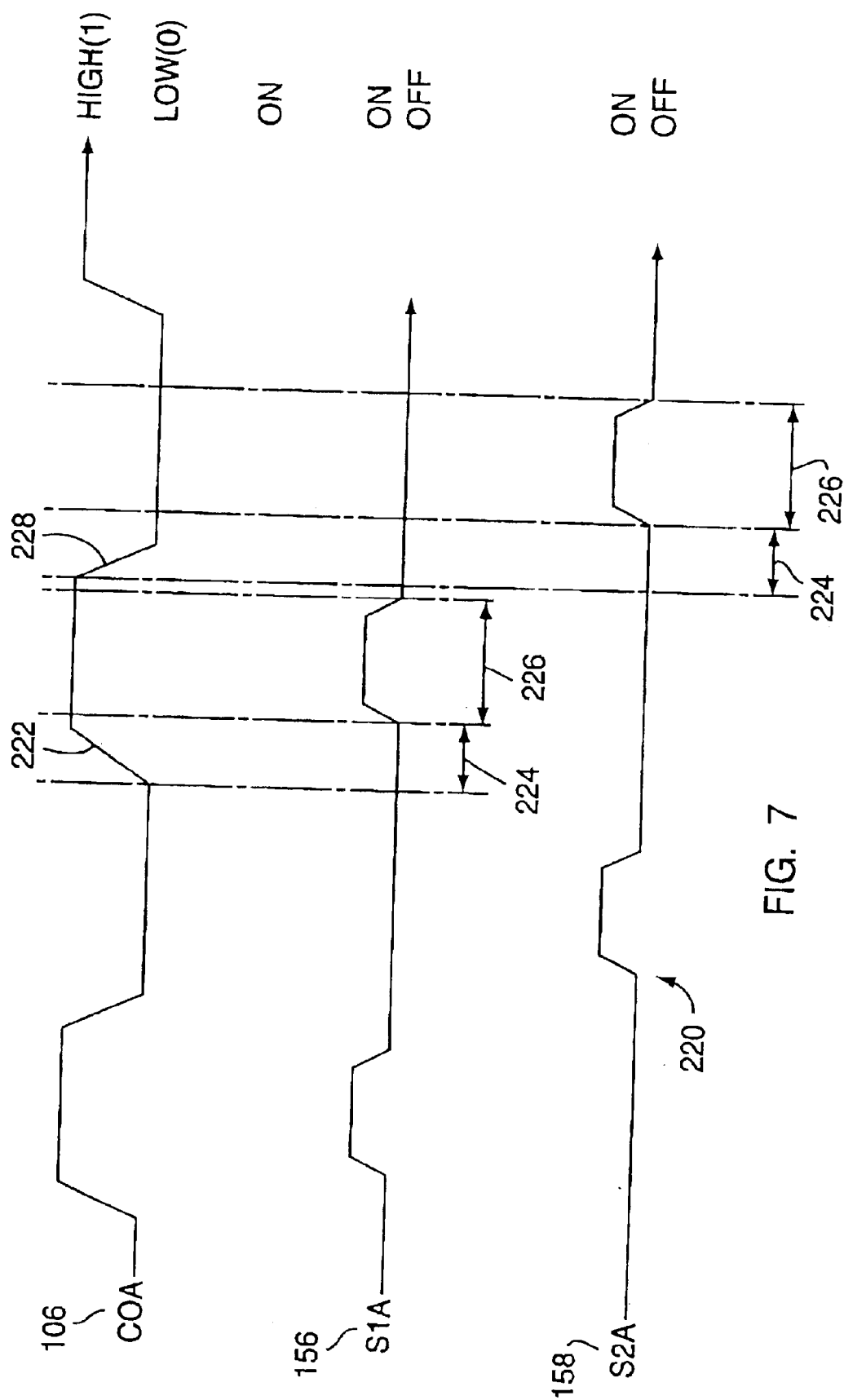
FIG. 7 is a timing diagram of the switches of an IO cell of FIG. 5 relative to the core output signal of the IO cell.

Referring to FIGS. 5 and 7, the timing diagram of switches S1A (156) and S2A (158) relative to COA (106) is shown generally at 220. When either S1A or S2A are "on", i.e., conducting, the capacitors 164 and 166 are integrating the signal CIA 162 to average out the effects of random noise, e.g., EMI from outside sources or di/dt noise from the power supply. However, a great deal of additional noise is generated when COA 106 transitions from a low state to a high state or vice versa. If either switch S1A or S2A are turned "on" during a COA transition, the capacitors 164 and 166 may not be able to effectively integrate out all of the noise. Accordingly the switch select circuit 160 utilizes the delay-on circuit 161 and the delay-off circuit 163 to time the switching of S1A and S2A to sample the outputs of differential amplifiers 134 and 136 between, but not during, transitions of the core output signal COA.

By way of example, upon a rising edge 222 of signal COA, the switch select circuit 160 will select switch S1A to be activated. However, the delay-on circuit 161 will prevent the activation of S1A by a delay time 224, in order to give COA enough time to complete its transition from low to high. Thereafter the delay-off circuit 163 will prevent the de-activation of S1A until just before a falling edge 228 of COA begins. Switch select circuit 160 will select switch S2A upon the occurrence of the falling edge 228 of COA. Accordingly, the delay-on circuit 161 will delay activation of S2A by the same delay time 224, and the delay-off circuit 163 will delay de-activation of S2A by the same delay time 226 to prevent sampling of output signal CIA during any transitions of COA.

Figure 8:
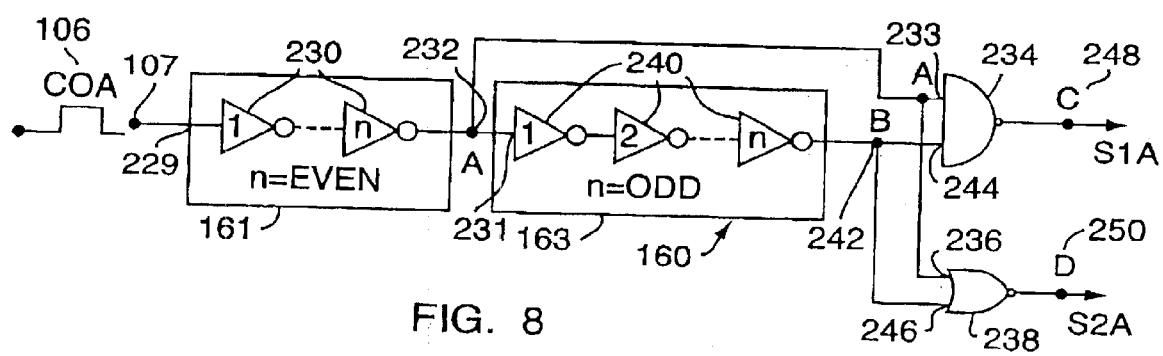
FIG. 8 is a schematic of the switch select circuit of an IO cell of FIG. 5.

Referring to FIG. 8, a schematic diagram of an exemplary embodiment of the switch select circuit 160 is shown. The core output signal is transmitted from node 107 into the input 229 of delay-on circuit 161. The delay-on circuit includes a predetermined even number of inverters 230 designed to delay the propagation of signal COA by the delay time 224 before it reaches node 232 (A). Propagating through an even number of inverters 230, insures that the signal at node A will follow COA as it transitions from 0 to 1. That is, even though the signal at node A is delayed by delay time 224 relative to COA, when COA transitions from low to high so will the signal at node A.

From node A, the signal is nearly simultaneously transmitted to the input 231 of delay-off circuit 163, an input 233 of nand gate 234 and an input 236 of nor gate 238. The delay-off circuit 163 includes an odd number of inverters 240 designed to delay the propagation of the signal COA by the delay time 226 before it reaches node 242 (B). Propagating through an odd number of inverters 240, insures that the signal at node B will be inverted relative to COA as it transitions from 0 to 1. That is, even though the signal at node B is delayed by delay time 226 relative to COA, when COA transitions from low to high the signal at node B will transition from high to low. From node B the signal is nearly simultaneously transmitted to the other input 244 of nand gate 234 and the other input 246 of nor gate 238.

The output 248 (C) of nand gate 234 activates S1A when its output is low, and conversely, the output 250 (D) of nor gate 238 activates S2A when its output is high. Significantly, the output 248 (C) of nand gate 234 is the complement of the output 250 (D) of nor gate 238. That is the nand gate output C only goes low when both inputs A and B are high and the output D only goes high when both inputs A and B are low.

Figure 9:
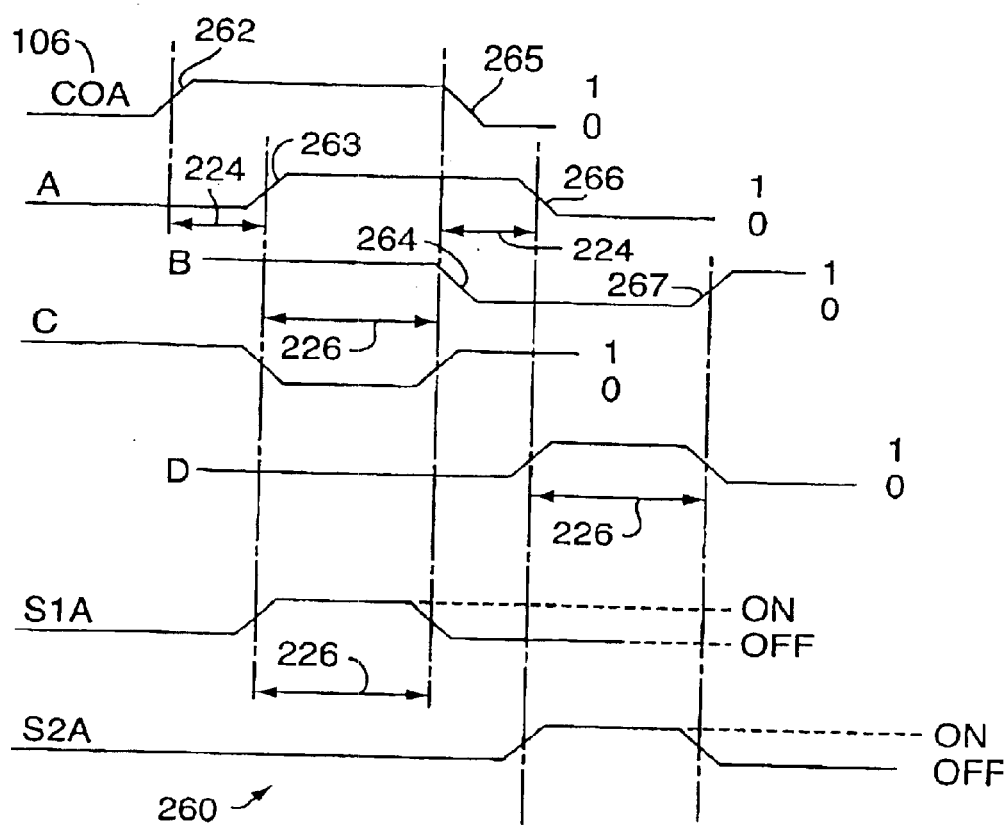
FIG. 9 is a timing diagram of the nodes of switch select circuit of FIG. 8.

Referring to FIGS. 8 and 9, the timing diagram of the nodes of switch select circuit 160 relative to signal COA is shown generally at 260. As COA 106 produces rising edge 262, i.e., transitions from 0 (low state) to 1 (high state), the inverters 230 of the delay-on circuit 161 delay the signal propagation to node A by the delay time 224. That is node A transitions from 0 to 1 after a delay time 224, as represented by rising edge 263. Inverters 230 are even in number so that the signal at node A will not be inverted relative to COA. Additionally, the total number of inverters 230 are chosen to produce a delay time 224 which enables the signal COA time to complete its transition before the signal at node A begins to change state.

The non-inverted signal at A than simultaneously enters the input 231 of the delay-off circuit 163 and the input 233 of nand gate 234. As signal A conducts through the odd number of inverters 240 of circuit 163, an inverted signal at node B is produced a delay time 226 later, as represented by falling edge 264. The total number of inverters 240 are chosen to size the delay time 226 to enable the signal B to complete its transition, i.e., falling edge 264, at approximately the same time as signal COA completes its transition, i.e., falling edge 265.

As can be seen from the timing diagram 160, during the time period between the rising edge 263 of the signal at A and the falling edge 264 of the signal at B, the inputs 233 and 244 of the nand gate 234 are both high. Accordingly, the output 248 (C) of nand gate 234 is low. This low output signal is utilized to hold switch S1A "on" during the delay time period 226. Therefore switch S1A is active, and capacitors 164 and 166 (see FIG. 5) are integrating only when the signal COA is in a steady state high, i.e., not transitioning.

As COA 106 transitions from 1 to 0 to produce falling edge 265, the signal at node A will transition from 1 to 0 to produce falling edge 266 a delay time period 224 thereafter. The non-inverted signal at A than enters the input 231 of the delay-off circuit 163 and passes through the even number of inverters 240, which produce an inverted signal at node B that is delayed by delay time 226. Accordingly, B produces rising edge 267 after a delay time 226 from the falling edge 266 of A. Therefore, during the time period between the falling edge 266 of the signal at A and the rising edge 267 of the signal at B, the inputs 236 and 246 of the nor gate 238 are both low. As a result, the output 250 (D) of nor gate 238 is high and is utilized to hold switch S2A "on" for the delay time period 226. Therefore switch S2A is active, and capacitors 164 and 166 (see FIG. 5) are integrating only when the signal COA is in a steady state low, i.e., not transitioning.

Referring again to FIG. 5, the total input signal 126 (TSA) at the IO node 122 is the sum of the amplified core output signal COA, plus incoming amplified signal COB (attenuated by the impedance of line 106), plus the total noise signal at node 122. From this signal TSA, the reference voltages REFH and REFL dynamically adjust out COA, while the remaining signal gets amplified by the receivers 134, 136 and integrated by capacitors 164, 166 to produce the core input signal CIA. The switch select circuit 160 will activate switches S1A and S2A solely during a steady state high or low of output signal COA as discussed above. Thus the large amount of noise, which can be induced into the core input signal CIA from the transitions of either signal COA or TSA, are avoided if the two signals COA and TSA are substantially in phase. However, signal TSA is often significantly out of phase relative to signal COA due to its component noise signal.

The noise signals at the node 122 includes power supply switching noise, EMI noise and signal reflections. The signal reflections are due at least in part to impedance mismatches between termination end points 122 and 124 across line 106, which will cause reflections of data signal COA to bounce back at a natural frequency that is a function of the length of the line 106. It is these signal reflections that are largely the cause of the signal TSA being phase shifted from signal COA.

Figure 10:
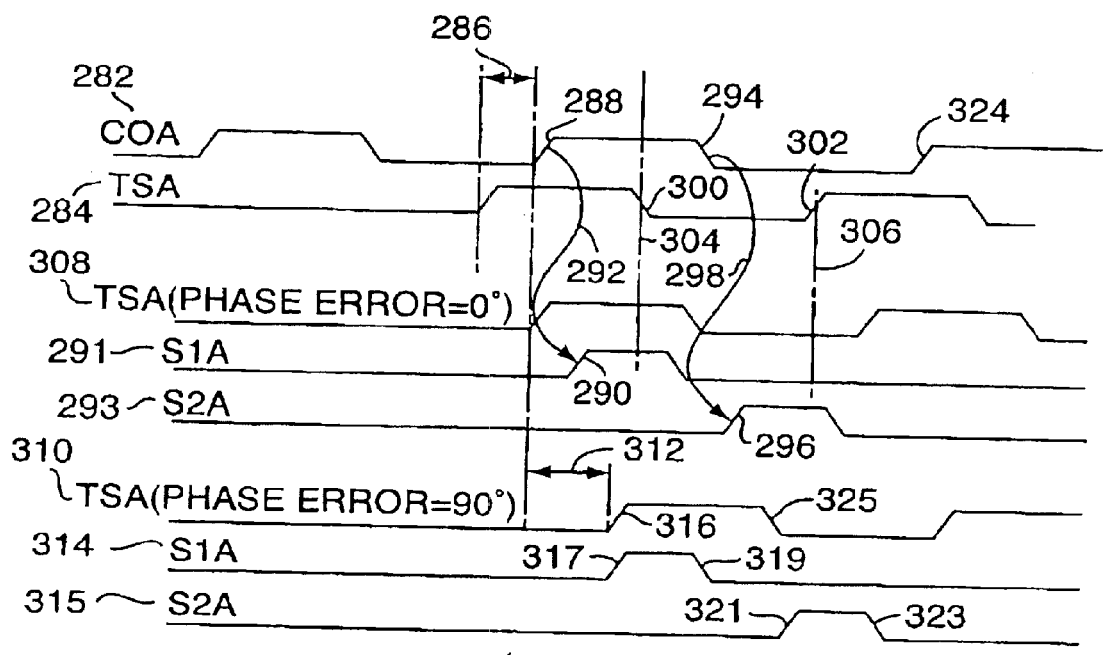
FIG. 10 is a timing diagram of total input signals having various phase angles relative to the core output signal and the switches.

Referring to FIG. 10, as timing diagram 280 shows, the signal TSA 284 (a reflected input signal) can have a phase angle 286 relative to signal COA 282. As explained earlier, the rising edge 288 will trigger the rising edge 290 of S1A 291 as represented by arrow 292. Additionally, the falling edge 294 of COA will trigger the rising edge 296 of S2A 293 as represented by arrow 298.

When TSA 284 is out of phase, S1A 291 is "on" when the transition 300 (in this case a falling edge) of TSA 284 occurs, as indicated by line 304. Moreover, S2A 293 is "on" during the transition 302 (in this case a rising edge) of TSA 284, as indicated by line 306. However, when TSA 308 is in phase, than S1A 291 is "on" only when both TSA 308 and COA 282 are in a steady state high condition. Additionally when TSA 308 is in phase with COA 282, than S2A 293 is "on" only when TSA 308 and COA 282 are in a steady state low condition.

Figure 11:
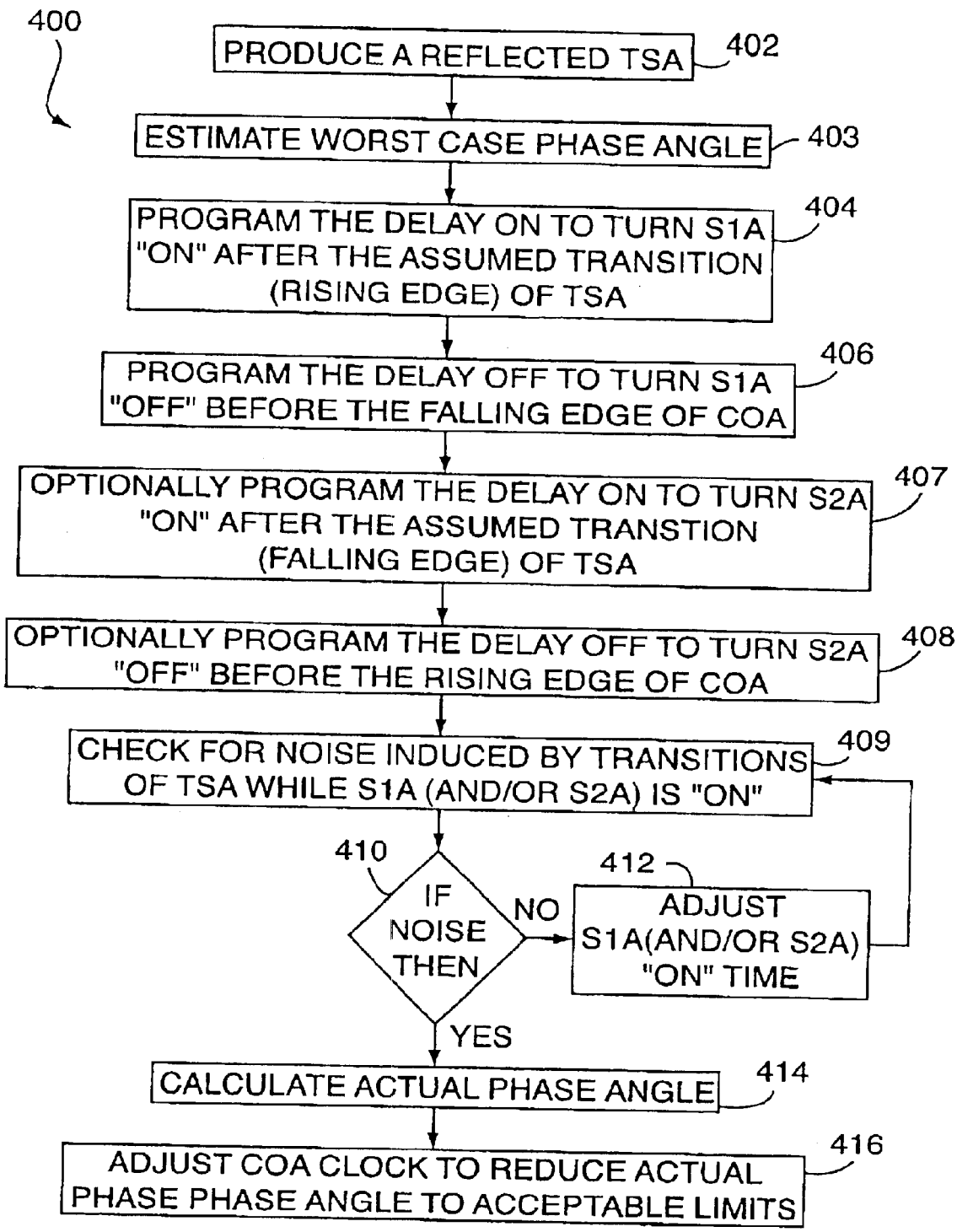
FIG. 11 is a flow diagram of a method of adjusting the phase angle between the core output signal and a reflected total input signal in accordance with the present invention.

Referring to FIGS. 10 and 11, since the natural frequency of the reflected noise component of TSA is dependant the length of the line it transmits through, it is difficult to predict or adjust. It is therefore important to adjust the timing of COA 282 to bring the two signals into phase, i.e., reduce the phase angle to about zero. A method to accomplish this task includes a search algorithm 400, which produces a reflected TSA 310 having a phase error 312 as represented in block 402 of FIG. 11. Stepping to block 403, the phase error 312 is initially unknown and is therefore estimated at a worst case phase error, e.g., 90 degrees. The reflected TSA 310 can be induced by providing a large impedance mismatch between line terminations.

From the estimated phase error 312, the delay-on circuit 161 (best seen in FIG. 8) can be programmed so that S1A 314 will turn "on" (produce rising edge 317) when it is clear of the assumed transition region 316 of TSA 310, as shown in block 404. Than as indicated in block 406, since the period for COA 282 is fixed and known, the delay-off 163 can be programmed to close S1A 314 (produce falling edge 319) before the falling edge 294 of COA 282 occurs.

Optionally, S2A 315 can also be programmed in the same manner. That is, as illustrated in block 407, rising edge 321 of S2A 315 will be delayed (by delay-on circuit 161) for a time greater than the estimated phase angle 312 after the occurrence of falling edge 294 of COA 282, in order to clear the falling edge 325 of TSA 310. Thereafter, as illustrated in block 408, the falling edge 323 of S2A 315 will be programmed by off-delay circuit 163 to occur before the occurrence of rising edge 324 of COA 282.

Stepping to block 409 of algorithm 400, the signal CIA 162 (see FIG. 5) is tested for noise which would have been induce from a transition 316 (and/or 325) of TSA 310 occurring when S1A 314 (and/or S2A 315) is in its "on" state. As shown in block 410, if no noise has occurred, than the algorithm steps to block 412 where the "on" time of S1A 314 is adjusted. This can be done by reducing the programmed delay time of delay-on circuit 161 and extending the delay time of delay-off circuit 163 by approximately equal amounts. This will expand the amount of time S1A is "on", while keeping in phase with the fixed cycle time of COA 282. Correspondingly, S2A 315 can also be adjusted by the same amount. After the "on" time of S1A 314 is adjusted the algorithm 400 loops back to block 408 to recheck for transition noise.

If however, transition noise is detected, than the algorithm steps from block 410 to block 414 where the actual phase angle 312 of TSA 310 is calculated based on the measured occurrence of the actual transitions 316 (and/or 325) of TSA 310. Accordingly, the algorithm proceeds to block 416 where the clock which drives COA 282 is adjusted to reduce the phase angle 312 to within acceptable limits, e.g., through the use of a phase lock loop or delay lock loop circuit. One skilled in the art will recognize that the algorithm 400 as described above can be accomplished through software, hardware or a combination of both.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A bi-directional input/output (IO) cell for transmitting and receiving data signals simultaneously over a single line, the bi-directional IO cell comprising:
an IO node adapted to connect to the line;
a driver having an output connected to the line and an input for receiving a core output signal;
a first differential amplifier having a first input connected to the IO node and a second input connected to a high voltage reference circuit; and
a second differential amplifier having a first input connected to the IO node and a second input connected to a low voltage reference circuit.

2. The IO cell of claim 1 comprising:
a first selector switch having an input connected to an output of the first differential amplifier; and
a second selector switch having an input connected to an output of the second differential amplifier;
wherein the first and second selector switches each have an output connected to a common receiver output node.

3. The IO cell of claim 2 comprising a switch selector circuit, the selector switch circuit including:
an input for receiving the core output signal;
a first switch select output connected to the first selector switch; and
a second switch select output connected to the second selector switch;
wherein, the switch selector circuit activates the first selector switch through the first switch select output when the core output signal is in a high state, and activates the second selector switch through the second switch select output when the core output signal is in a low state.

4. The IO cell of claim 3 comprising:
a first capacitor in series connection between a power supply voltage (Vdd) of the IO cell and the common receiver output node; and
a second capacitor in series connection between a voltage common (Vss) of the IO cell and the common receiver output node;
wherein the first and second capacitors integrate the output of the first and second differential amplifiers to produce a core input signal.

5. The IO cell of claim 4 wherein the first and second differential amplifiers each comprise:
a first plurality of transistors connected to have a first internal capacitance between Vdd and the amplifier output; and
a second plurality of transistors connected to have a second internal capacitance between Vss and the amplifier output;
wherein the ratio of the first internal capacitance to the second internal capacitance is approximately equal to the ratio of capacitance of the first capacitor to capacitance of the second capacitor.

6. The IO cell of claim 5 wherein
the first plurality of transistors have a first internal leakage current between Vdd and the amplifier output; and
the second plurality of transistors have a second internal leakage current between Vss and the amplifier output;
wherein the ratio of the first internal leakage current to the second internal leakage current is approximately equal to the ratio of leakage current of the first capacitor to leakage current of the second capacitor.

7. The IO cell of claim 3 wherein the switch selector circuit comprises:
a delay-on circuit having an input for receiving the core output signal, and an output, wherein the delay-on circuit provides a first delay time from the initiation of a first transition of the core output signal such that the first transition is complete before the selector switch is activated; and
a delay-off circuit having an input connected to the output of the delay-on circuit, wherein the delay-off circuit provides a second delay time from the completion of the first delay time such that the selector switch remains activated for substantially the second delay time and thereafter de-activates before the start of the next proceeding transition of the core output signal.

8. The IO cell of claim 7 wherein the delay-on circuit prevents the activation of the first selector switch until the core output signal has completed a transition from the low state to the high state, and thereafter prevents the activation of the second selector switch until the core output signal has completed the next proceeding transition from the high state to the low state.

9. The IO cell of claim 8 wherein:
the delay-on circuit includes a first number of inverters in series connection, the first number sized to provide the first delay time; and
the delay-off circuit includes a second number of inverters in series connection, the second number sized to provide the second delay time.

10. The IO cell of claim 9 wherein the first number of inverters is an even number or inverters and the second number of inverters is an odd number of inverters.

11. The IO cell of claim 1 wherein the first input of the first and second differential amplifiers is a non-inverting input, and the second input of the first and second differential amplifiers is an inverting input.

12. The IO cell of claim 3 wherein the first and second selector switches include transistors.

13. A bi-directional input/output (IO) cell for transmitting and receiving data signals simultaneously over a single line, the bi-directional IO cell comprising:
an IO node adapted to connect to the line;
a driver having an output connected to the line and an input for receiving a core output signal;
a first differential amplifier having a first input connected to the IO node and a second input connected to a high voltage reference circuit;
a second differential amplifier having a first input connected to the IO node and a second input connected to a low voltage reference circuit;
a first selector switch having an input connected to an output of the first differential amplifier;
a second selector switch having an input connected to an output of the second differential amplifier; and
a selector switch circuit including,
an input for receiving the core output signal,
a first switch select output connected to the first selector switch, and
a second switch select output connected to the second selector switch,
wherein, the switch selector circuit activates the first selector switch through the first switch select output when the core output signal is in a high state, and activates the second selector switch through the second switch select output when the core output signal is in a low state.

14. The IO cell of claim 13 comprising:
a receiver output node connected in common to an output of the first selector switch and an output of the second selector switch;
a first capacitor in series connection between a power supply voltage (Vdd) of the IO cell and the receiver output node; and
a second capacitor in series connection between a voltage common (Vss) of the IO cell and the receiver output node;
wherein the first and second capacitors integrate the output of the first and second differential amplifiers to produce a core input signal.

15. The IO cell of claim 14 wherein the first and second differential amplifiers each comprise:
a first plurality of transistors connected to have a first internal capacitance between Vdd and the amplifier output; and
a second plurality of transistors connected to have a second internal capacitance between Vss and the amplifier output;
wherein the ratio of the first internal capacitance to the second internal capacitance is approximately equal to the ratio of capacitance of the first capacitor to capacitance of the second capacitor.

16. The IO cell of claim 15 wherein
the first plurality of transistors have a first internal leakage current between Vdd and the amplifier output; and
the second plurality of transistors have a second internal leakage current between Vss and the amplifier output;
wherein the ratio of the first internal leakage current to the second internal leakage current is approximately equal to the ratio of leakage current of the first capacitor to leakage current of the second capacitor.

17. The IO cell of claim 13 wherein the switch selector circuit comprises:
a delay-on circuit having an input for receiving the core output signal, and an output, wherein the delay-on circuit provides a first delay time from the initiation of a first transition of the core output signal such that the first transition is complete before the selector switch is activated; and
a delay-off circuit having an input connected to the output of the delay-on circuit, wherein the delay-off circuit provides a second delay time from the completion of the first delay time such that the selector switch remains activated for substantially the second delay time and thereafter de-activates before the start of the next proceeding transition of the core output signal.

18. The IO cell of claim 17 wherein the delay-on circuit prevents the activation of the first selector switch until the core output signal has completed a transition from the low state to the high state, and thereafter prevents the activation of the second selector switch until the core output signal has completed the next proceeding transition from the high state to the low state.

19. The IO cell of claim 18 wherein:
the delay-on circuit includes a first number of inverters in series connection, the first number sized to provide the first delay time; and
the delay-off circuit includes a second number of inverters in series connection, the second number sized to provide the second delay time.

20. The TO cell of claim 19 wherein the first number of inverters is an even number or inverters and the second number of inverters is an odd number of inverters.

21. A method of adjusting a phase angle between a core output signal and reflected input signal of a bi-directional input/output (IO) cell connected to a line, the bi-directional IO cell having at least a first selector switch for selecting between high and low reference voltages respectively, the method comprising:
producing the reflected signal having the phase angle relative to the core output signal on the line;
estimating the phase angle;
programming a first delay time for activation of the first selector switch from the initiation of a first core output signal transition, such that the reflected signal with the estimated phase angle would complete a first reflected signal transition before the first selector switch is activated;
programming a second delay time from the completion of the first delay time, such that the first selector switch remains activated for substantially the second delay time and thereafter de-activates before the start of a sequentially second core output signal transition;
checking for an anticipated noise signal induced by the reflected signal transition while the first selector switch is activated;
calculating the actual phase angle of the reflected signal based on the detected noise signal; and
adjusting the core output signal to reduce the phase angle to acceptable limits.

22. The method of claim 21 comprising:
adjusting the first delay time to change the time of activation of the first selector switch relative to the initiation of the first core output signal transition if the anticipated noise signal is not detected;

adjusting the second delay time to change the time of de-activation of the first selector switch relative to the first delay time; and rechecking for the anticipated noise signal.

23. The method of claim 21 comprising:

programming the first delay time for activation of a second selector switch of the bi-directional IO cell from the initiation of the sequentially second core signal transition, such that the reflected signal with the estimated phase angle would complete a sequentially second reflected signal transition before the second selector switch is activated;

programming the second delay time from the completion of the first delay time, such that the second selector switch remains activated for substantially the second delay time and thereafter de-activates before the start of the sequentially third core signal transition of the core output signal; and checking for an anticipated noise signal induced by transitions of the reflected signal while the first and second selector switches are activated.

24. The method of claim 21 wherein the estimated phase angle is an estimated worst case phase angle.

25. The method of claim 21 wherein the first core signal transition is a rising edge.

* * * * *